United States Patent [19]
Rappoport et al.

[11] 3,789,748
[45] Feb. 5, 1974

[54] MULTI-PURPOSE ROTISSERIE-BROILER COMBINATION

[75] Inventors: Seymour Rappoport, Rumson; William J. Rakocy, Clifton, both of N.J.

[73] Assignee: Ronson Corporation, Woodbridge, N.J.

[22] Filed: Feb. 24, 1972

[21] Appl. No.: 228,809

[52] U.S. Cl. ................ 99/340, 99/390, 99/401, 99/446
[51] Int. Cl. ......................................... A47j 37/06
[58] Field of Search ..... 99/340, 380, 390, 401, 421, 99/444, 446–447, 450; 219/385–386, 387, 391, 402, 404–405

[56] References Cited
UNITED STATES PATENTS

| 2,024,386 | 12/1935 | Phelps | 99/340 UX |
|---|---|---|---|
| 2,690,497 | 9/1954 | Wiggins | 99/340 UX |
| 2,893,307 | 7/1959 | Rodriguez | 99/421 V |
| 2,900,482 | 8/1959 | Aylor | 99/390 X |
| 2,984,730 | 5/1961 | Ostrom et al. | 99/390 X |
| 3,177,342 | 4/1965 | Wickenberg | 99/390 X |
| 3,193,663 | 7/1965 | Budzich et al. | 99/447 UX |

Primary Examiner—William I. Price
Assistant Examiner—Arthur O. Henderson
Attorney, Agent, or Firm—Toren, McGeady & Stanger

[57] ABSTRACT

A combined rotisserie-broiler having a movable heating element which can be placed adjacent or remote from food to be cooked. The rotisserie-broiler is a multi-purpose unit having a removable hood, reflector and fry pan which can be arranged in a plurality of positions to permit the user to selectively fry, grill, broil, sear and bake foods.

6 Claims, 8 Drawing Figures

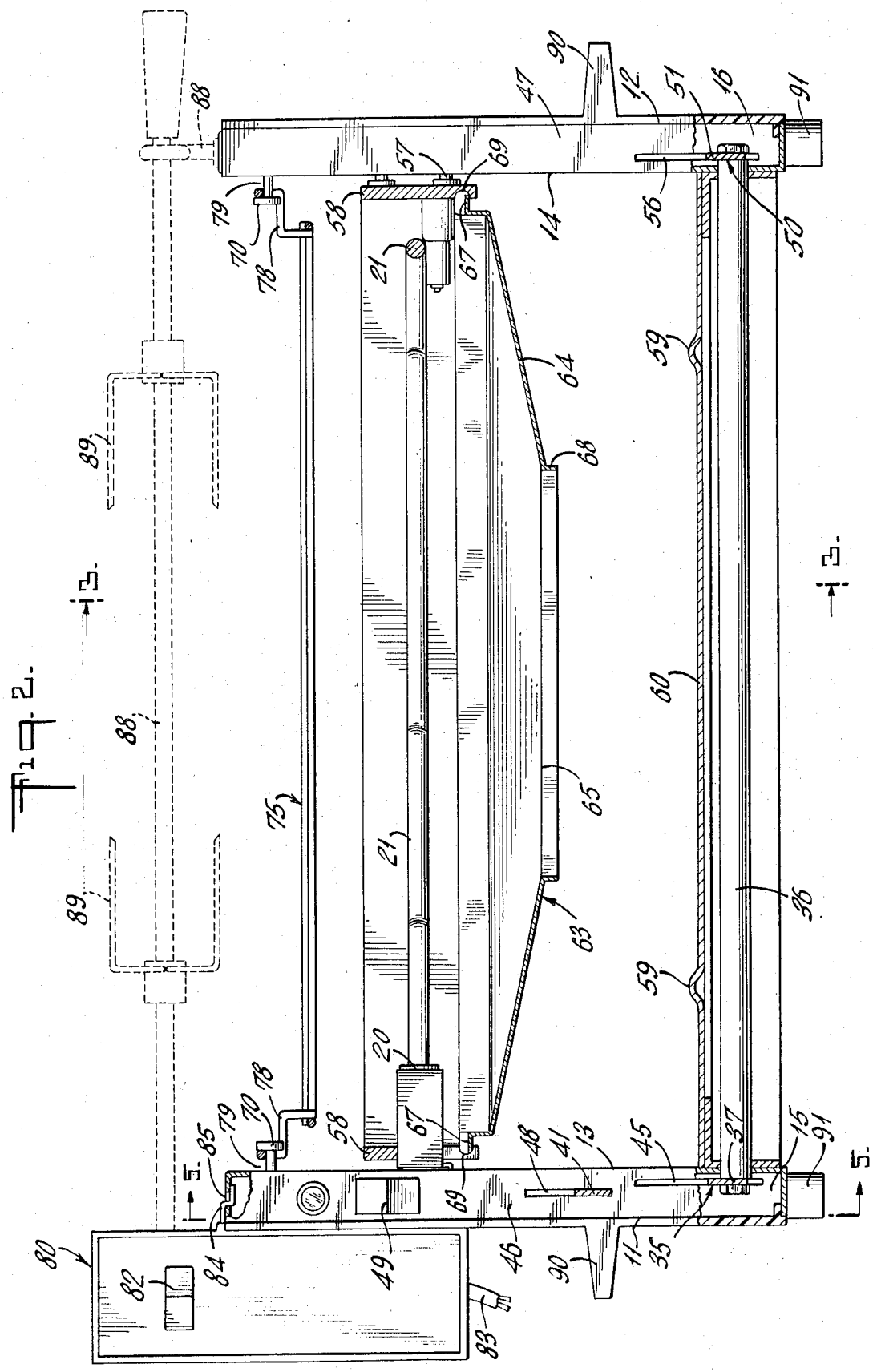

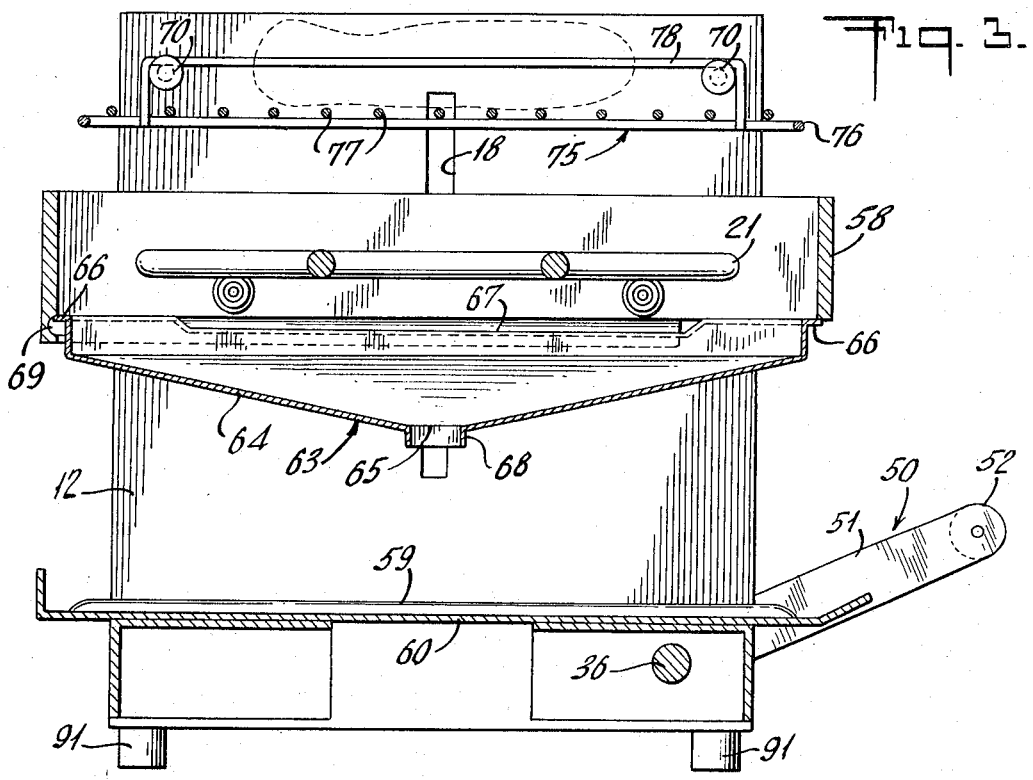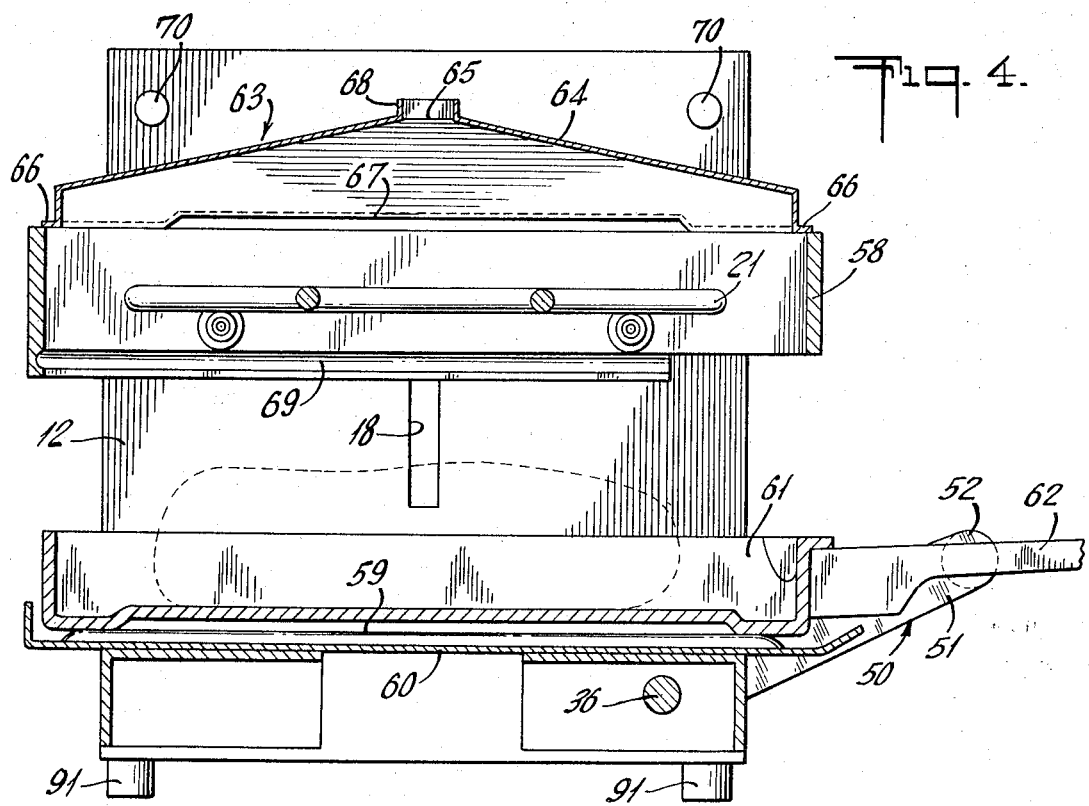

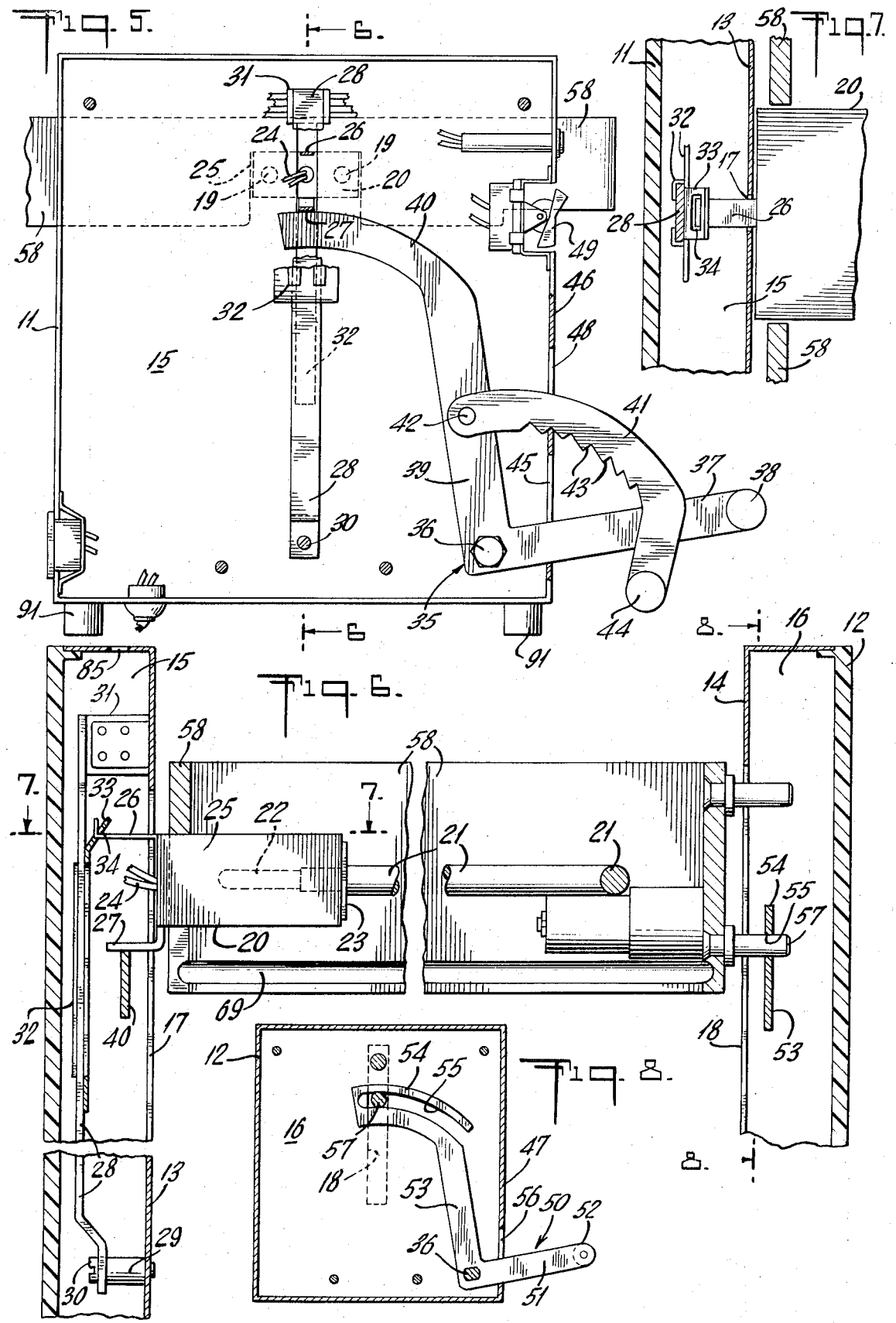

3,789,748

MULTI-PURPOSE ROTISSERIE-BROILER COMBINATION

This invention pertains to a combined rotisserie broiler having removable parts which permit the operator to perform many types of food preparation.

Portable electric cooking appliances sometimes called a "rotisserie" have been known for many years. An example of a portable electric cooker is shown in U. S. Pat. No. 3,119,000, which issued Jan. 21, 1964 and is entitled "Cooking Appliance". This type of cooking appliance is used by many housewives throughout the world, however, it will not perform all forms of cooking operations.

In order to further the capabilities of a portable cooking utensil, a combined rotisserie and broiler was developed such as shown in U. S. Pat. No. 2,831,954 issued Apr. 22, 1958 and entitled "Adjustable Rotisserie and Broiler". This oven enabled the housewife to apply a skewer through a foodstuff such as fowl and rotate it in the presence of a heating element so as to provide even heat, however, it was not able to accomplish other cooking functions.

A device capable of performing multiple cooking functions was developed as shown in U. S. Pat. No. 2,898,437 issued Aug. 4, 1959 entitled "Combination Electric Cooking Appliance". This broiler has a heating element therein which is pivotable to two positions thereby allowing one to roast, bake, broil and grill. The latter broiler still was not able to accomplish all cooking functions in which one of the most important is a rotisserie.

This invention overcomes the inadequacies of the prior art by providing in one compact unit a portable cooking appliance which will fry, grill, broil, sear and bake foods and function as a rotisserie. All of the latter are combined in a broiler which is of relatively simple construction and is simple to operate thereby making it appealing to the general public and to women in particular.

The broiler-rotisserie oven of this invention has a movable heating element which can be moved between an infinite number of spaced positions with respect to food within the oven. A reflector can be placed over or under the heating element to reflect heat towards the food to be cooked. The reflector can be placed in a plurality of positions. A fry pan can also be placed within the broiler so as to hold foods therein to be fried.

The oven has protuberances therein upon which a grill can be suspended for grilling foods. The grill can be easily removed for cleaning. A hood is placed over the oven to maintain the heat within the oven for more efficient cooking. A rotisserie is suspended within the oven which has a motor driven skewer thereon in which the rotisserie portion can be enclosed by the hood if desired.

BRIEF DESCRIPTION OF DRAWING

FIG. 2 is a front elevation showing a skewer in phantom lines and other portions partially in section;

FIG. 3 is a view taken along the line 3—3 of FIG. 2, showing the reflector in a lower position;

FIG. 4 is a view showing the reflector in an upper position;

FIG. 5 is a view taken along the line 5—5 of FIG. 2;

FIG. 6 is a view taken along the line 6—6 of FIG. 5;

FIG. 7 is a view taken along the line 7—7 of FIG. 6; and

FIG. 8 is a view taken along the line 8—8 of FIG. 6.

Figure 1:
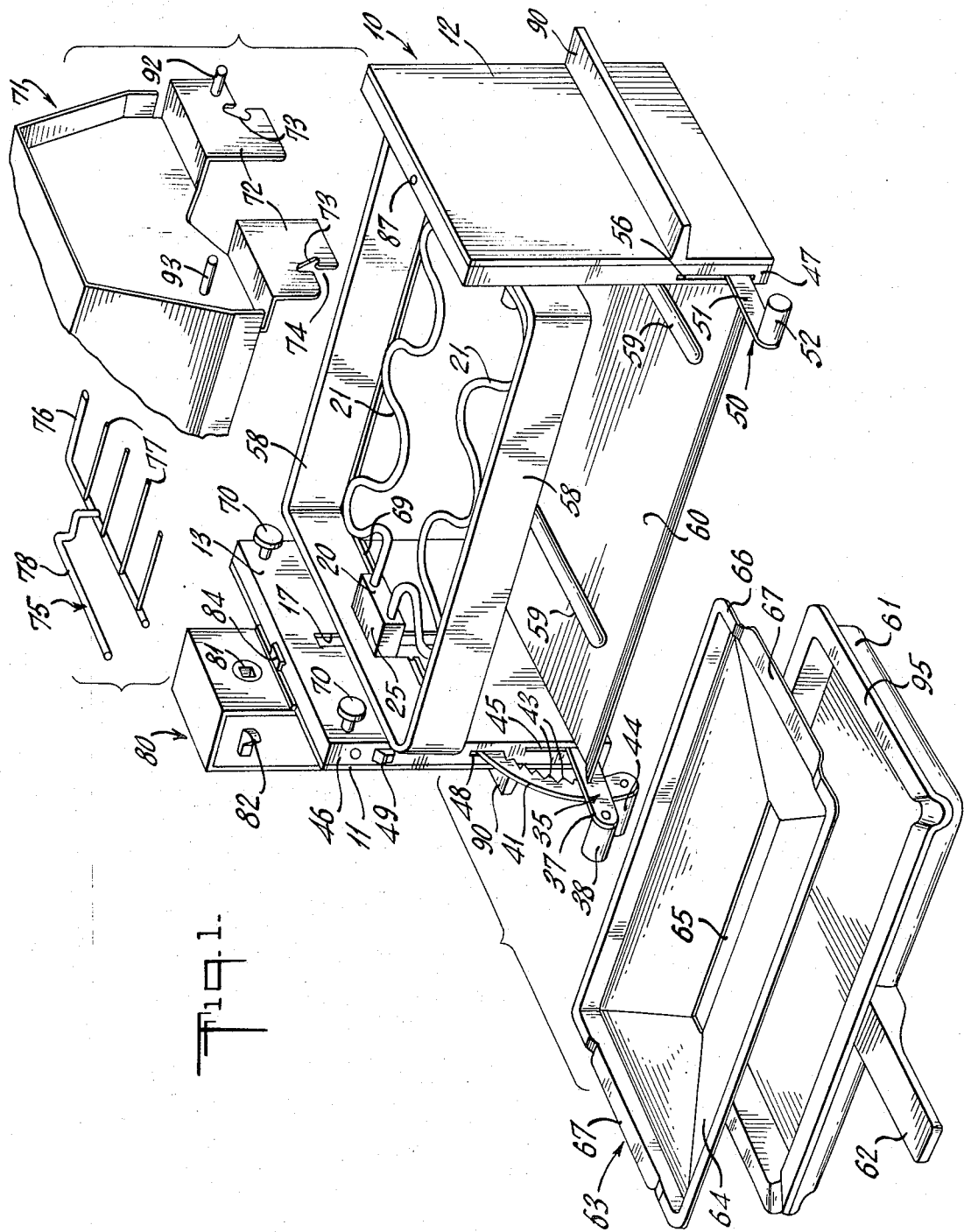
FIG. 1 is an exploded view of the rotisserie-broiler oven of this invention.

Referring to the drawings and more particularly to FIG. 1 thereof, there is shown a broiler-rotisserie oven 10 formed by upstanding outside walls 11 and 12 and inside walls 13 and 14 spaced therefrom which define hollow chambers 15 and 16 respectively (see FIG. 2). A pair of opposed grooves 17 and 18 are each formed on the respective inner walls 13 and 14, (FIGS. 1 and 6). A pair of metallic sockets 19 (FIG. 5) are housed in an insulating ceramic block 20. A known heating rod 21 generally known as a "calrod" having connecting prongs 22 thereon is plugged into the sockets 19 to make electrical contact therewith. A limit flange 23 (FIG. 6) can be used on the heating rod 21 to limit the insertion of the prongs 22 into the sockets 19. Electrical leads 24 are connected to the sockets at one end and to a source of live voltage at the other within the chamber 15. A metallic cover 25 surrounds the ceramic insulating block 20 in which an L-shaped leg 26 and a lower leg 27 extend from the cover 25 into the chamber 15 to function as a holding bracket. A guide plate 28 has one end fixed to the broiler wall 13 by a screw 30 or other fastener and spaced therefrom by a bushing 29. The other end of the guide plate 28 is fixed to a spacer 31 which is similarly secured to the broiler wall 13. A guide bearing 32 is slidably secured to the plate 28 so as to be longitudinally movable thereon. The guide bearing 32 has an angular portion 33 struck off the bearing and has an opening 34 therein which receives the L-shaped leg 26 of the block cover 25. The bearing 32 thereby serves to guide the movement of the block 20 within the groove 17 and retains it on the broiler wall 14.

A rotatable lever 35 is pivotably secured by a longitudinal rod 36 to the broiler. The rod can extend through the width of the broiler (see FIG. 2). The lever 35 includes an outwardly extending leg 37 having a handle 38 thereon and an upwardly extending leg 39 having curved leg portion 40. The lever 35 is secured to the broiler so that the curved leg 40 bears against the lower leg 27 which is fixed to the block 20. Thus, it can be readily seen in FIG. 5 that counterclockwise movement of the lever 35 serves to lower the block 20 and clockwise movement of the lever 35 causes the arcuate arm 40 to raise the block and the heating element 21 therewith. The heating element can be locked in a number of positions by a locking arm 41 which is pivotably and loosely secured by a pin 42 to the arm 39. The locking arm 41 has teeth 43 formed therein along the lower edge of the locking arm 41. The arm 41 has a handle 44 affixed thereto to facilitate grasping the arm 41. The leg 37 extends through a slot 45 in the front wall 46 of the chamber 15 and the locking arm 41 extends through the slot 48. The teeth 43 on the locking arm 41 cooperate with the lower edge of the slot 48 such that when a tooth engages the edge of the slot it prevents movement of the lever 35 similar to a ratchet. In order to release the lever, the locking arm is grasped by the handle 44 and lifted whereby the teeth are removed from the edge of the slot and the lever is free to move.

A switch 49 is pivotally mounted on the front wall 46 of the broiler 10 and serves to energize the circuit to the heating coil 21 and deenergizes the latter when it is desired to shut the unit off.

In order to assist in raising and lowering the heating element 21, a lever 50 is pivotally secured within the opposite chamber 16 by being attached to the longitudinal rod 36. The lever 50 includes an outwardly extending leg 51 having a handle 52 thereon and an inwardly extending leg 53 which terminates in an arcuate leg 54 having a slot 55 therein. A slot 56 is formed in the front wall 47 through which the leg 51 extends and is freely movable therewithin. Thus, when the handle 52 is depressed, it rotates in a clockwise direction and serves to raise the pin 57 upwardly. The pin 57 is secured to a frame 58 which surrounds the heating element 21. The frame functions as a heat retainer and as a carrier for the heating element. It can be readily observed that upon grasping the handles 38 and 52 and pulling upward, the user can move the heating element 21 to any desired position. The arm 41 by means of the teeth 43 thereon will lock the heating element 21 in the desired position.

A pair of protuberances 59 can be formed in the lower wall 60 in order to space a fry pan 61 from the lower wall. A handle 62 on the fry pan makes it convenient to handle. A heat reflector 63 is provided to reflect heat upon the food being cooked and also serves to guide cooking drippings such as grease and fat into the fry pan 61. The reflector has sides 64 which taper downwardly and inwardly and culminate in a longitudinal slot 65 through which food drippings pass. A skirt 68 can be formed at the end of the slot if desired. A circumferential flange 66 extends around the periphery of the reflector and is formed into a widened portion 67 on opposite sides of the reflector. A ridge 69 is formed on the lower edge of the frame 58 which serves to support the reflector 63 in one of its positions.

A plurality of supports 70, here shown as four, are fixed to the opposite walls 13 and 14 of the broiler 10. A hood 71 is shown in FIG. 1 in which a portion has been broken away; however, it is symmetrical. The hood is formed of sheet metal and has a pair of depending brackets 72 on each side of the hood. The brackets have a cutout area 73 therein and a lead-in groove 74 is formed by cutting a corner of each bracket. It can be seen from FIG. 1 that the lead-in grooves 74 are to be placed over the supports 70 whereby the cutout area is slipped upon the support. The hood 71 can rest on all four supports or it can be tilted away from the broiler 10 and be held by two supports in which a pin 92 functions as a back stop. Another pin 93 can be used for lifting and lowering the hood.

A wire formed grill 75 having a frame 76 and a plurality of wire grids 77 and a handle 78 welded to the frame can be held by the supports 70. The handle 78 is constructed such that it will fit over the supports 70 and be suspended thereby over the heating coil 21. A space 79 (see FIG. 2) is maintained between the handle 78 and the wall 14 of the broiler 10 which permits the bracket 72 of the hood 71 to fit on the support 70 at the same time that the wire grill 75 is being held. A housing 80 encloses a small electric motor therein which drives a shaft having a socket opening 81 on the end thereof. A switch 82 serves to actuate the electric motor and leads 83 carry current from a 110 volt voltage source. The housing 80 carries a z-shaped clip 84 thereon which can be inserted into an opening 85 of the top wall of the chamber 15 as shown in FIG. 2. This provides ample support for the relatively light motor housing. A known skewer support 86 rests on the top wall of the opposite chamber 16 by being inserted into an opening 87 formed in the top wall. A known skewer 88 having adjustable food holding prongs 89 thereon is rotatably driven by the electric motor within the housing 80.

A pair of handles 90 can be conveniently located on the opposite walls of the broiler to facilitate lifting the broiler, and four supports 91 can be placed on the bottom of the broiler to space it from its supporting surface.

Rotisserie cooking can be accomplished by attaching the motor housing 80 to the wall 11 of the broiler 10. The pointed end of the spit 88 is placed in the drive socket 81 and the support 86 is placed in the opening 87 whereby the wall 12 supports the opposite end of the spit. The food to be cooked will have already been placed on the skewer and secured thereto. The hood 71 is then placed on the supports 70. The hood will maintain the heat around the food and will reduce splattering considerably thereby saving the kitchen from becoming a mess and reducing cleanup time. The reflector 63 is then slid into the bottom of the frame 58 to reflect the heat toward the food and the fry pan 61 is placed on the bottom of the broiler to catch the drippings. The drippings are shielded from the heating coil 21; thus, the risk of a flame from the grease burning is eliminated. In order to check the progress of the cooking, the user can raise the hood 71 by lifting upwardly on the outwardly extending pin 93 and the hood 71 will pivot upwardly on the supports 70 which are on the opposite end of the hood 71 from the pin 93. The heating element 21 can be raised or lowered to any desired position by raising or lowering the handles 38 and 52 and locking the coil in the desired position with the locking arm 41.

Frying can be accomplished by sliding the heat reflector 63 onto the ledge 69 of the heating frame. The flange 95 on the frying pan is placed over the supports 70 in order to suspend the pan and the hood is placed on the supports between the flange 95 and the walls 13 and 14 of the broiler. The heating coil 21 is then raised or lowered to the desired proximity with respect to the fry pan 61.

Grilling can be accomplished by placing the heat reflector 63 on the bottom of the frame 58. The handles 78 on the grill 75 are then draped over the supports 70 and the hood 71 is placed over the grill on the supports 70. The heating element 21 can then be raised or lowered with respect to the grill. For quick searing of the food the heating coil can be positioned as close as possible to the grill. The heating element can then be lowered for slower cooking. The fry pan 61 is placed on the bottom wall 60 to catch the drippings.

Broiling of foods can be accomplished by placing the food to be cooked on the grill 75 or in the fry pan 61 depending on the food to be cooked. For example fish, stuffed tomatoes or other foods which break up easily would be better placed in the fry pan while foods such as meat can be placed on the grill. The heat reflector 63 is then placed over the frame 58 and the opening 65 can be covered with a cap (not shown). The heating element can be raised close to the food to sear it and can then be lowered so as to provide for slower cooking.

In order to clean the broiler, the heating element frame 58 is lowered to its lowest position and the heating element is pulled out of the ceramic block 20. The frame 58 is then removed by lifting upwardly on the end which rests on the ceramic block 20 until the pins on the right side of the frame are clear of the slot. The broiler can then be completely cleaned and the parts replaced in a similar manner.

While there has been shown and described a particular embodiment of this invention, it will be obvious to those skilled in the art that various changes and modifications can be made therein without departing from the invention, and therefore, it is intended in the appended claims to cover all such changes and modifications as fall within the true spirit and scope of the invention.

We claim:

1. In a multi-purpose food preparation device comprising walls forming a housing and including a pair of opposed upstanding walls, a heating frame, means for mounting said heating frame within said housing between said opposed walls for movement in the upward and downward directions, a heating element located within said housing and removably secured to and supported by said heating frame for movement with said heating frame within said housing, a hood removably mounted on said housing and overlying said heating element, said hood displaceably positionable on said housing between at least two different positions, multiple food support members removably mountable within said housing, a heat reflector removably mounted in said housing and selectively positionable in at least a first position located above said heating frame and a second position located below said heating frame and in the second position said reflector having a downwardly depending portion with a slot in its lower end through which food drippings can pass, said means for movably mounting said heating frame includes a bracket attached to one end of said heating frame and movably supported in one of said opposed walls, a pin attached to the opposite end of said heating frame and slidably displaceable relative to the opposite one of said opposed walls, lever means pivotally mounted on said housing and including a first lever supporting said pin and a second lever engageable with said bracket for movably displacing said heating frame within said housing.

2. In a multi-purpose food preparation device, as set forth in claim 1, wherein a guide bearing is movably supported in the one of said opposed walls for movement in the upward and downward direction, said bracket including a leg movably secured to said guide bearing for guiding the upward and downward movement of said heating frame.

3. In a multi-purpose food preparation device, as set forth in claim 2, wherein said second lever includes an arcuate leg which engages and supports said bracket for moving said bracket in the upward and downward direction guided by said guide bearing.

4. In a multi-purpose food preparation device, as set forth in claim 3, wherein locking means are associated with said second lever and cooperate with the one of said opposed walls for fixing said second lever and heating frame in a desired position within said housing.

5. In a multi-purpose food preparation device, as set forth in claim 5, wherein said locking means comprises an arm pivotally secured to said second lever, a plurality of teeth formed in said arm extending along the underside thereof, the one of said opposed walls having a slot therein and said arm extending through the slot so that said teeth are selectively engageable with the one of said opposed walls at the slot for removably locking said arm and said second lever in desired position.

6. In a multi-purpose food preparation device, as set forth in claim 1, wherein said first lever having an arcuate slot therein for supporting said pin, and the opposite one of said opposed walls having a slot therein extending in the upward direction and said pin being slidably displaceable therein in response to pivotal movement of said lever transmitted to said pin through the arcuate slot in said first lever.

* * * * *